United States Patent
Cheok et al.

(10) Patent No.: US 10,334,278 B2
(45) Date of Patent: *Jun. 25, 2019

(54) METHODS AND APPARATUS FOR INTEGRATING EXTERNAL APPLICATIONS INTO AN MPEG-4 SCENE

(71) Applicant: AT&T Intellectual Property II, L.P., Atlanta, GA (US)

(72) Inventors: Lai-tee Cheok, New York, NY (US); Atul Puri, Riverdale, NY (US); Robert Schmidt, Howell, NJ (US)

(73) Assignee: AT&T INTELLECTUAL PROPERTY II, L.P., Atlanta, GA (US)

( * ) Notice: Subject to any disclaimer, the term of this patent is extended or adjusted under 35 U.S.C. 154(b) by 18 days.

This patent is subject to a terminal disclaimer.

(21) Appl. No.: 15/295,458

(22) Filed: Oct. 17, 2016

(65) Prior Publication Data
US 2017/0034535 A1  Feb. 2, 2017

Related U.S. Application Data

(63) Continuation of application No. 14/059,880, filed on Oct. 22, 2013, now Pat. No. 9,473,770, which is a
(Continued)

(51) Int. Cl.
*G06F 17/21* (2006.01)
*H04N 19/85* (2014.01)
(Continued)

(52) U.S. Cl.
CPC ............. *H04N 19/85* (2014.11); *G06F 16/40* (2019.01); *G06F 17/211* (2013.01);
(Continued)

(58) Field of Classification Search
CPC .... G06F 17/211; G06F 17/2235; G06F 16/40; H04N 19/85; H04N 19/00903;
(Continued)

(56) References Cited

U.S. PATENT DOCUMENTS

| 4,394,680 A | 7/1983 | Wantanbe |
| 5,117,283 A | 5/1992 | Kroos et al. |

(Continued)

FOREIGN PATENT DOCUMENTS

EP  0753970  1/1997

OTHER PUBLICATIONS

Eleftheriadis et al, editors, "Text for CD 14496-1 Systems", Int'l. Organization for Standardisation, Coding of Moving Pictures and Audio, ISO/IEC JTC1/SC29/WG11, N1901, Nov. 21, 1997.
(Continued)

*Primary Examiner* — Thu V Huynh

(57) ABSTRACT

A method of decoding, composing and rendering a scene. First information is obtained, the first information including a part of a MPEG-4 BIFS scene description stream and at least one coded MPEG-4 media stream. The first information is decoded by invoking a BIFS scene decoder and one or more specific media decoders that are required by the scene. Second information is obtained, the second information including a second part of a BIFS scene description stream that contains a reference to an external application. The second information is decoded by invoking the BIFS scene decoder and an external application decoder. An integrated scene is composed, the integrated scene including one or more decoded MPEG-4 media objects and one or more external application objects specified in the decoded scene descriptions streams. The composed integrated scene is rendered on a display.

20 Claims, 5 Drawing Sheets

Related U.S. Application Data continuation of application No. 12/325,822, filed on Dec. 1, 2008, now Pat. No. 8,566,692, which is a continuation of application No. 11/170,996, filed on Jun. 29, 2005, now Pat. No. 7,461,330, which is a continuation of application No. 09/613,292, filed on Jul. 10, 2000, now Pat. No. 6,934,906.

(60) Provisional application No. 60/142,745, filed on Jul. 8, 1999, provisional application No. 60/156,441, filed on Sep. 28, 1999.

(51) Int. Cl.
*G06F 16/40* (2019.01)
*G06F 17/22* (2006.01)
*H04N 21/234* (2011.01)
*H04N 21/44* (2011.01)
*H04N 21/472* (2011.01)
*H04N 21/858* (2011.01)
*H04L 29/08* (2006.01)

(52) U.S. Cl.
CPC ... *G06F 17/2235* (2013.01); *H04N 21/23412* (2013.01); *H04N 21/44012* (2013.01); *H04N 21/47205* (2013.01); *H04N 21/8586* (2013.01); *H04L 67/02* (2013.01)

(58) Field of Classification Search
CPC ....... H04N 21/47205; H04N 21/23412; H04N 21/44012; H04N 21/8586; H04L 67/02
See application file for complete search history.

(56) References Cited

U.S. PATENT DOCUMENTS

| | | |
|---|---|---|
| 5,194,941 A | 3/1993 | Grimaldi et al. |
| 5,659,490 A | 8/1997 | Imamura |
| 5,745,360 A | 4/1998 | Leone et al. |
| 5,748,789 A | 5/1998 | Lee et al. |
| 5,786,855 A | 7/1998 | Chen et al. |
| 5,963,257 A | 10/1999 | Katata et al. |
| 5,974,172 A | 10/1999 | Chen |
| 5,974,184 A | 10/1999 | Eifrig et al. |
| 5,978,510 A | 11/1999 | Chung et al. |
| 5,999,219 A | 12/1999 | Boon |
| 5,999,944 A | 12/1999 | Lipkin |
| 6,044,397 A | 3/2000 | Eleftherladis et al. |
| 6,092,107 A | 7/2000 | Eleftheriadis et al. |
| 6,122,014 A | 9/2000 | Panusopone et al. |
| 6,141,442 A | 10/2000 | Chen |
| 6,185,602 B1 | 2/2001 | Bayrakeri |
| 6,195,088 B1 | 2/2001 | Signes |
| 6,208,693 B1 | 3/2001 | Chen et al. |
| 6,233,356 B1 | 5/2001 | Haskell et al. |
| 6,240,412 B1 | 5/2001 | Dyko |
| 6,246,680 B1 | 6/2001 | Muller et al. |
| 6,295,380 B1 * | 9/2001 | Takahashi ............... H04N 7/52 341/79 |
| 6,317,131 B2 | 11/2001 | Basso et al. |
| 6,459,732 B2 | 10/2002 | Chen et al. |
| 6,463,444 B1 | 10/2002 | Jain et al. |
| 6,496,233 B1 | 12/2002 | Christine et al. |
| 6,556,207 B1 | 4/2003 | Julien |
| 6,611,262 B1 | 8/2003 | Suzuki |
| 6,631,403 B1 | 10/2003 | Deutsch et al. |
| 6,654,931 B1 | 11/2003 | Haskell et al. |
| 6,665,318 B1 | 12/2003 | Tomokane et al. |
| 6,697,869 B1 | 2/2004 | Mallart et al. |
| 6,766,355 B2 | 7/2004 | Liang et al. |
| 6,895,555 B1 | 5/2005 | Ando |
| 6,934,906 B1 | 8/2005 | Cheok |
| 6,988,241 B1 | 1/2006 | Guttman et al. |
| 7,461,330 B1 | 12/2008 | Cheock et al. |
| 8,566,692 B2 | 10/2013 | Cheok |
| 2003/0037156 A1 | 2/2003 | Mallart |
| 2003/0048844 A1 | 3/2003 | Mallart et al. |
| 2003/0191754 A1 | 10/2003 | Dey |
| 2004/0054965 A1 | 3/2004 | Haskell et al. |

OTHER PUBLICATIONS

Hartman et al, *The VRML 2.0 Handbook Building Moving Worlds on the Web*, pp. 45-46, 264-265, Silicon Graphics, Inc. Addison-Wesley Publishing Co., 1996.
"The Virtual Reality Modeling Language Specification". Version 2.0, ISO-IEC CD 14772, Aug. 4, 1996.
Technical Paper, FDIS/BIFS Chapter 9, Sections 9.1 through 9.4. 2.100.2, Nov. 1998.
Chen et al. IEEE *Transactions on Circuits and Systems for Video Technology*, Coding of Subregions for Content-Based Scalable Video:, vol. 7, No. 1, pp. 256-260, Feb. 1995.
MPEG Video Verification Model VM 5.0, pp. 2-192.
Chen et al., IEEE International Conference on Image Processing, "An Approach to Region Coding for Content-Based Scalable Video", vol. 3, pp. 399-402, Sep. 16, 1996.
"MPEG-4 Standard Completed", Int'l. Organization for Standardisation, Coding of Moving Pictures and Audio, ISO/IEC JTC1/SC29/WG11, N2403, 6 pages, Oct. 1998.
MPEG-4 Systems, "Coding of Audio-Visual Objects: Systems", ISO/IEC JTC 1/SC 29/WG 11, N2501, ISO/IEC 14496-1:19999(E), Dec. 18, 1998.
MPEG-4 Systems Group, "MPEG-4 Systems version 2 Verification Model 6.0", ISO IEC JTC1/SC29/WG11, N2741, Mar. 1999.
MPEG-4 Systems Group, "Text for ISO/IEC 14496-1/PDAM1" ISO/IEC JTC1/SC29/WG11, N2739, Mar. 1999.
A. Puri and A.M. Tekalp, "MPEG-4 and MPEG-7 Standards", Electronic Imaging, Course Notes, San Jose, Jan. 1999.

* cited by examiner

METHODS AND APPARATUS FOR INTEGRATING EXTERNAL APPLICATIONS INTO AN MPEG-4 SCENE

CROSS-REFERENCE TO RELATED APPLICATIONS

This application is a continuation of U.S. patent application Ser. No. 14/059,880, filed Oct. 22, 2013, now U.S. Pat. No. 9,473,770, issued Oct. 18, 2016, which is a continuation of U.S. patent application Ser. No. 12/325,822, filed Dec. 1, 2008, now U.S. Pat. No. 8,566,692, issued Oct. 22, 2013, which is a continuation of U.S. patent application Ser. No. 11/170,996, filed Jun. 29, 2005, now U.S. Pat. No. 7,461, 330, issued Dec. 2, 2008, which is a continuation of Ser. No. 09/613,292, filed Jul. 10, 2000, now U.S. Pat. No. 6,934, 906, issued Aug. 23, 2005, which claims priority from U.S. Provisional Application Ser. No. 60/142,745, filed on Jul. 8, 1999, and U.S. Provisional Application Ser. No. 60/156,441, filed on Sep. 28, 1999, the contents of which are incorporated herein by reference in their entirety.

FIELD OF THE INVENTION

The present invention relates to the field of digital multimedia compression technology. More particularly, the present invention relates to methods and apparatus for integrating an MPEG-4 decoder with an interface of another application that does not conform to the MPEG-4 standard.

BACKGROUND

Various types of data decoding devices and applications generate digitally based presentations which may be experienced by an individual or group of people. Digitally based presentations may be generated by, for example, digital movie players (e.g., a DVD player), digital music players (e.g., a CD player), World Wide Web browsers, Portable Document Format readers (e.g., ADOBE ACROBAT READER), spread-sheet software, word-processing software, operating system software, and video game players. Such presentations may be multimedia presentations that include some combination of text, graphics, video, animation, and/or sound. In addition, digitally based presentations may be interactive presentations that allow users to enter data or commands.

In the above-described systems, coded audiovisual information is used as input to generate the presentation. In the World Wide Web browser, for example, browser software (such as INTERNET EXPLORER from MICROSOFT Corp.) executing on a general purpose computer may be used to decode HTML pages (i.e., audiovisual information) and generate an interactive multimedia presentation. Typically, the various types of systems require various different coding formats for the audiovisual information. For example, a World Wide Web browser ("Web browser") may not be able to operate using data that is formatted for a CD player.

The Moving Picture Expert Group (MPEG) of the International Organization for Standardization (ISO) has introduced standards for coding of audiovisual information. These standards include MP3, MPEG-1, MPEG-2, and MPEG-4. MPEG-4 provides a standard for representing units, known as "media objects," of aural, visual or audiovisual content. These media objects can be of natural origin (e.g., recorded with a camera or microphone) or synthetic origin (e.g., generated with a computer). MPEG-4 specifies a standard for describing the composition of these objects and for combining these objects to form audiovisual "scenes." A description of MPEG-4 is set forth in MPEG-4 Standard ISO/IEC, 14496-1, hereby incorporated by reference, as well as in Multimedia Systems, Standards and Networks (Atul Puri and Tsuhan Chen, Editors). An MPEG-4 decoder receives a bit-stream of data that was originally authored by coding media objects according to the MPEG-4 systax. The MPEG-4 decoder then may present the scene specified in the coded data by, for example, displaying the scene on a computer monitor or a television screen. The scene could contain text, graphics, video, animation, and/or sound in any combination.

Many systems and applications that generate digitally based presentations, such as a Web browser or Portable Document Format reader, do not conform to the MPEG-4 standard. In some cases, the author of a scene might want to include the presentation from a non-MPEG-4 application, such as a Web browser, into the scene generated by an MPEG-4 decoder. However, prior to the present invention, MPEG-4 did not provide a method or apparatus by which the author of the scene could integrate an application that does not conform to the MPEG-4 standard into a scene generated by an MPEG-4 decoder.

SUMMARY OF THE INVENTION

Embodiments of the present invention provide methods and apparatus to integrate an application that does not conform to the MPEG-4 standard (an "external application") into a scene generated by an MPEG-4 decoder. An embodiment defines a Binary Format for Scenes (BIFS) node that allows an external application to exist within the MPEG-4 scene graph. In this embodiment, the external application controls and renders the windowed region in the MPEG-4 scene, for which the external application's interface is defined, allowing natural user interaction with the application. In a further embodiment, the scene node is designated "ApplicationWindow." The present invention provides a node interface, including data definitions and functionality, for the newly defined node.

DETAILED DESCRIPTION

Embodiments of the present invention provide for the integration of an external application into an MPEG-4 scene. The phrase "external application" refers to an application that does not conform to some version of the MPEG-4 standard, and the phrase "MPEG-4 scene" refers to a scene generated by a decoder that decodes an MPEG-4 conformant bit-stream. According to embodiments of the present invention, the external application may be presented in an application window within the MPEG-4 scene on a display device. As described further below, a decoding device that operates according to embodiments of the present invention may be a general purpose computer, a digital signal processor, or a special purpose device such as an application specific integrated circuit. The logic that integrates the non-MPEG-4 application with the MPEG-4 decoder may be incorporated for example into software instructions, firmware, or a special purpose hardware circuit. The MPEG-4 decoder and external application may decode audiovisual information that is stored in a local memory, streamed, or downloaded from a network. According to embodiments of the present invention, the author of the MPEG-4 scene may specify features such as the location and size of the application window in the scene, the time when the application is running, whether the external application runs in the background, ext.

Figure 1:
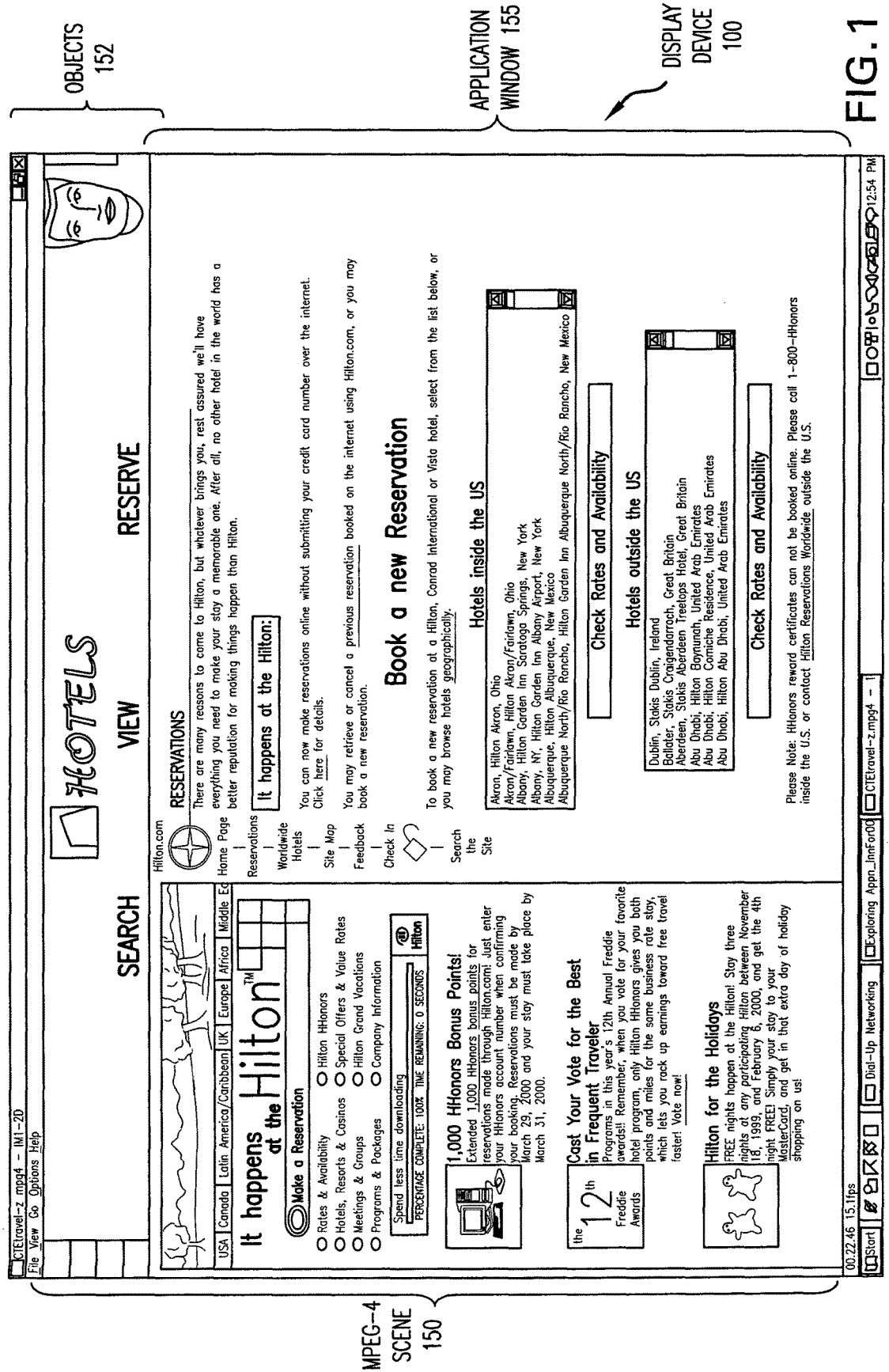
FIG. 1 is a block diagram of a scene rendered from MPEG-4 audiovisual information which includes an external application integrated therein according to an embodiment of the present invention.

FIG. 1 is a block diagram of a scene rendered from MPEG-4 audiovisual information which includes an external application integrated therein according to an embodiment of the present invention. FIG. 1 shows a display device 100 which may be any type of display device capable of displaying information. In an embodiment, display device 100 is a monitor for a general purpose computer system. In another embodiment, display device 100 is a television screen. In another embodiment, display device 100 is a display for an information appliance.

In FIG. 1, display device 100 is displaying an MPEG-4 scene 150 that was generated by an MPEG-4 decoder. In this embodiment, the MPEG-4 decoder is running on a general purpose computer that uses an operating system in the MICROSOFT WINDOWS family of operating systems. In this embodiment, in addition to MPEG-4 scene 150, display device 100 also contains information such as a Task Bar that was generated by the MICROSOFT WINDOWS operating system. The MPEG-4 decoder that generates MPEG-4 scene 150 may be any type of MPEG-4 decoder, such as a modified MPEG-4 IM1 reference software implementation.

As shown in FIG. 1, MPEG-4 scene 150 is a page of an electronic travel agency and contains MPEG-4 objects 152 and an application window 155. As illustrated, the application window 155 is a sub-scene that occupies approximately the bottom ⅔ of the MPEG-4 scene 150. Of course, the application window 155 may be any size and may be located anywhere within MPEG-4 scene 150. The objects 152 include a talking head agent as well as text items for Search, View, and Reserve options. In other embodiments, the MPEG-4 scene may contain any objects that may be present in an MPEG-4 scene.

In an embodiment, MPEG-4 scene 150 is context dependent, and different information is shown depending upon whether the user selects the Search, View or Reserve option. In FIG. 1, the user has selected the Reserve option, and the application window 155 is controlled by a Web browser (e.g., INERNET EXPLORER) that is displaying a hotel reservation page. According to an embodiment of the present invention, the application window 155 is integrated into the MPEG-4 scene. Within the MPEG-4 decoder, a user may interact with MPEG-4 native objects (e.g., objects 152) or with the application running in the application window 155. MPEG-4 native objects may be anything defined by an MPEG-4 node, such as for example a graphical object or a textual object. In this embodiment, the Web browser is not a full featured Web browser (e.g., does not contain Back command, Forward command, Bookmark command, ext.), but in other embodiments any type of Web browser may be used. The MPEG-4 decoder may change the information displayed in response to the MPEG-4 bit-stream or user interaction with MPEG-4 native objects (e.g., by moving the talking head) or the external application may change the information displayed (e.g., by displaying a new HTML page). The present invention may be used with any MPEG-4 scene and any type of external application, such as a Virtual Reality Modeling Language (VRML) application, Java applet, ext. The mechanism for converging the MPEG-4 scene and the external application interface are discussed below.

Figure 2:
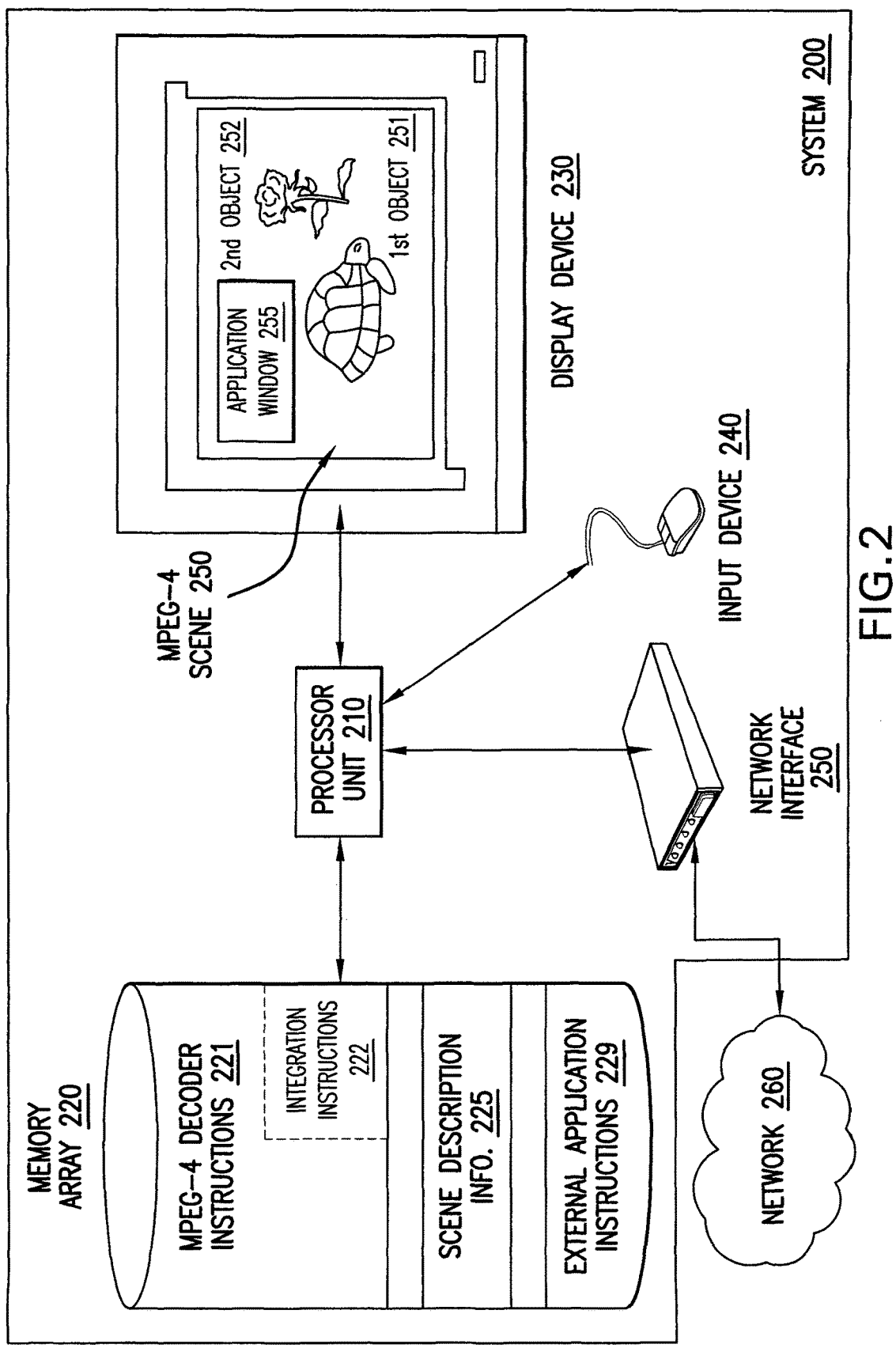
FIG. 2 is a block diagram of a system for integrating an external application into an MPEG-4 scene according to an embodiment of the present invention.

FIG. 2 is a block diagram of a system 200 for integrating an external application into an MPEG-4 scene according to an embodiment of the present invention. System 200 may be used to decode audiovisual information that previously had been coded according to any version of the MPEG-4 standard.

In addition, system 200 is capable of running an external application, such as a Web browser. System 200 may be a general purpose computer or a special purpose device, such as, for example, a set-top box or an information appliance.

As shown in FIG. 2, system 200 contains a processor unit 210 that is coupled to a memory array 220, a display device 230, an input device 240, and a network interface 250. In other embodiments, system 200 may contain additional devices or may contain a subset of these devices. The term "coupled" encompasses a direct connection, an indirect connection, or an indirect communication. Processor unit 210 may be any type of processor capable of executing instructions, such as for example a microprocessor, microcontroller, or special purpose hardware. Memory array 220 may be a single memory device or may be a plurality of memory devices. Memory array 220 may be any type of computer readable medium and may be or may include a RAM memory, a ROM memory, or a disk memory. In FIG. 2, input device 240 is shown as a mouse. In other embodiments, other types of input devices, such as a keyboard, may be used instead of or in addition to input devices 240. Network interface 250 is connected to network 260. Network 260 may be any information systems network across which information may be sent. Examples of the network 260 include a wireline telephone network, a wireless telephone network, the Internet, an intranet, a virtual private network, or any combination of these devices. Any type of network interfaces, such as a network interface card or a modem, may be used as or in addition to network interface 250.

Display device 230 may be any type of display device that may display information. In FIG. 2, display device 230 is displaying an MPEG-4 scene 250. MPEG-4 scene 250 contains a first object 251 (a turtle) and a second object 252 (a flower) in addition to an application window 255. MPEG-4 scene 250 may be generated by MPEG-4 decoder instructions 221 as described below. First object 251 and second object 252 may be any types of media objects conforming to an MPEG-4 compliant bit-stream, decodable by an MPEG-4 decoder, such as text, graphics, video, or animation. In a further embodiment, MPEG-4 scene 250 may contain more or less objects than shown in FIG. 2. Application window 255 is interactive with and rendered by an external application such as a Web browser, Portable Document Format reader, spreadsheet software, ext.

Memory array 250 may contain MPEG-4 decoder instructions 221, integration instructions 222, scene description information 225 in the form of an MPEG-4 bit-stream, and external application instructions 229. An MPEG-4 stream is information that may be read be an MPEG-4 decoder. The MPEG-4 stream may be information stored or a memory device or may be information that is transferred over a network such as the Internet. An MPEG-4 stream may include an MPEG-4 scene description streams (e.g., a coded version of a scene description that was written in a MPEG-4 scene description language) as well as one or more MPEG-4 media streams (e.g., a coded version of a media object such as MPEG-2 audio, MPEG-2 video, MPEG-4 audio, MPEG-4 video, audio animation, visual animation, ext.). An MPEG-4 media stream may be decoded by an appropriate specific application decoder, such as a video decoder or audio decoder. The decoder instructions 221 and integration instructions 222 may be adapted to be executed by a processor. The phrase "instructions adapted to be executed by a processor" is meant to encompass source code, assembler, and any other expression of instructions that may require preprocessing in order to be executed by processor.

Scene description information 225 may be binary audio-visual information that has been coded by an MPEG-4 coder. Scene description information 225 may describe, for example, MPEG-4 scene 250. MPEG-4 decoder instructions 221 are a software embodiment of an MPEG-4 decoder as discussed above. MPEG-4 decoder instructions 221 may be executed by processor unit 210 to decode scene description information 225 and generate MPEG-4 scene 250.

External application instructions 229 may be the instructions for an external application such as a Web browser, Portable Document Format reader, spreadsheet software, ext. In this embodiment, external application instructions 229 act as an external application decoder and decode information that is in a format recognized by the external application. MPEG-4 decoder instructions may contain integration instructions 222 for integrating the MPEG-4 decoder with an external application such as external application instructions 229. According to this embodiment, integration instructions 222 may be invoked when the MPEG-4 decoder instructions 221 encounter a reference to an external application in the scene description information 225 that calls for the integration of an external application into the MPEG-4 scene. In this embodiment, the integration instructions 222 may use scene description information 225 to configure and start external application instructions 229 as discussed below. The external application instructions 229 may then render the sub-scene in application window 255, may receive user input from input device 240, and may access network 260.

According to another embodiment of the present invention, the scene description information 225 need not be stored in memory 220, but rather may be a bit-stream of data that is accessed from a network such as network 260. In a further embodiment, the bit-stream of the scene description information 225 may be stored in a memory in device 200 as it is streamed. In a further embodiment, the external application instructions 221 need not be stored on memory array 250 but rather may be accessed via network 260. In a still further embodiment, MPEG-4 decoder instructions 221 are not stored on memory array 220 but are accessed via network 260.

In another embodiment, system 200 contains MPEG-4 decoder logic instead of MPEG-4 decoder instructions 221. In this embodiment, MPEG-4 decoder logic may be firmware or a circuit that performs MPEG-4 decoding. MPEG-4 decoder logic may be part of a decoder board.

In another embodiment, the reference to an external application in the scene description information that provides for the integration of an external application into the MPEG-4 scene is a MPEG-4 BIFS node. BIFS is an MPEG language for scene description. In an embodiment, the position of the external application, its dimension, whether the application is active or not, ext., may be specified through BIFS scene authoring. A scene description written in VRML-like text can be used by a MPEG-4 coder to develop a binary coded version (i.e., BIFS) of the audiovisual information that makes up a scene. BIFS nodes are the scene graph elements that may be used to describe audio-visual primitives and their attributes, along with the structure of the scene graph itself. In an embodiment, the BIFS node contains information that may be used to configure and start the external application. In a further embodiment, the node may be coded and included in a scene description bitstream.

In an embodiment, the node that provides for the integration of an external application into the MPEG-4 scene is the "ApplicationWindow" node. When the MPEG-4 decoder encounters an ApplicationWindow node, it may use the information contained in the node to integrate an application into the MPEG-4 scene. That is, the decoder may start the application and may create an application window when it encounters the ApplicationWindow node. The windowed region may be controlled and rendered by the external application, thus allowing natural user interaction with the application. The ApplicationWindow node may allow an external application such as a Web browser to exist within the MPEG-4 scene graph. In an embodiment, the ApplicationWindow node is an SF2D node, according to an MPEG-4 standard. In an embodiment, the node interface of the ApplicationWindow node may be defined as follows:

| | ApplicationWindow | | |
|---|---|---|---|
| | type | field name | default value |
| | { | | |
| exposedField | SFBooI | isActive | FALSE |
| exposedField | SFTime | startTime | 0 |
| exposedField | SFTime | stopTime | 0 |
| exposedField | SFString | description | |
| exposedField | MFString | parameter | |
| exposedField | MFString | url | 0 |
| exposedField | SFVec2f | size | 0, 0 |
| | } | | |

In an embodiment, the MPEG-4 encoder may place designations before each field in the ApplicationWindow node which may be used by the decoder to determine what the information contained in the field is to be used for. In this embodiment, the fields can be written by the scene's author in any order.

The "url" field contains Universal Resource Locator information for the external application to be opened. The url field may carry the location where software for the external application resides. The location may be within the decoder system (e.g., within a general purpose computer) or may be accessible over a network such as the Internet. The url field may be a string. When the ApplicationWindow node gets coded, the url field is coded into binary information. When the ApplicationWindow node is decoded, the decoder may use the url to find the location of the external application. In an embodiment, the default value for the url field is null. In this embodiment, if a url is not specified, an external application will not be integrated.

The "size" field provides the dimension (width and height) of the application window, for example in units of pixels. As shown above, the default value for the size field is 0.0. In an embodiment, if a size is not specified, an application window will not be displayed. In an embodiment, the location of the application window is not specified within the ApplicationWindow node, but rather (as shown below) is specified in the parent node. In an embodiment, the location may be provided relative to a reference location of the application window.

The "parameter" field carries parameters to be interpreted by the application decoder when the application window is instantiated. This field may contain any required parameters for starting the application. The parameters may be passed to the external application. As shown above, the default value for the parameter field is null. In an embodiment, if parameters are not specified, no parameters will be passed to the external application.

The "description" field allows a prompt to be displayed as an alternative to the "url" in the "url" field. In this embodiment, if a string is not specified, a prompt will not be displayed. Thus, the scene's author may select whether or not to display a prompt. As shown above, the default value may be a blank string.

The "startTime" field indicates when the external application is to be started. At the time specified in this field, the application is given control of the rendering window defined by the size field. The "stopTime" field indicates that the application is finished and should be shut down. At the time specified by the stopTime field, the rendering window defined by the size field is returned to the MPEG-4 player. In an embodiment, the default value for startTime and stopTime is 0. In this embodiment, if a startTime is not specified, the external application's starting time is not delayed. In a further embodiment, the times may be specified relative to an MPEG-4 decoder clock.

The "isActive" field signals the application is to relinquish its rendering window to the MPEG-4 player, but to continue to run. That is, when the isActive filed is specified as "FALSE," the application runs in the background. The value of the isActive field for a node may be changed during the execution of the external application.

In another embodiment, the node may use different designations, have different fields, or have different default values. For example, in another embodiment, the ApplicationWindow node may have a subset of the fields described above.

An example of the text used to generate BIFS commands that may be used by a scene author to integrate an application into an MPEG-4 scene according to an embodiment of the present invention is provided below. The code fragment below may be used to generate the MPEG-4 scene shown in FIG. 3 and is described below with reference to FIG. 3. The code fragment below is only a part of the BIFS scene description used to generate this scene, but it is useful to convey an understanding of the invention.

```
Transform2D {
    translation -50 150
    children [
        def APPWIN_1 ApplicationWindow {
            url "www.att.com"
            startTime           0
            stopTime            0
            isActive            TRUE
            size                300, 300
        }
    ]
}
```

Figure 3:
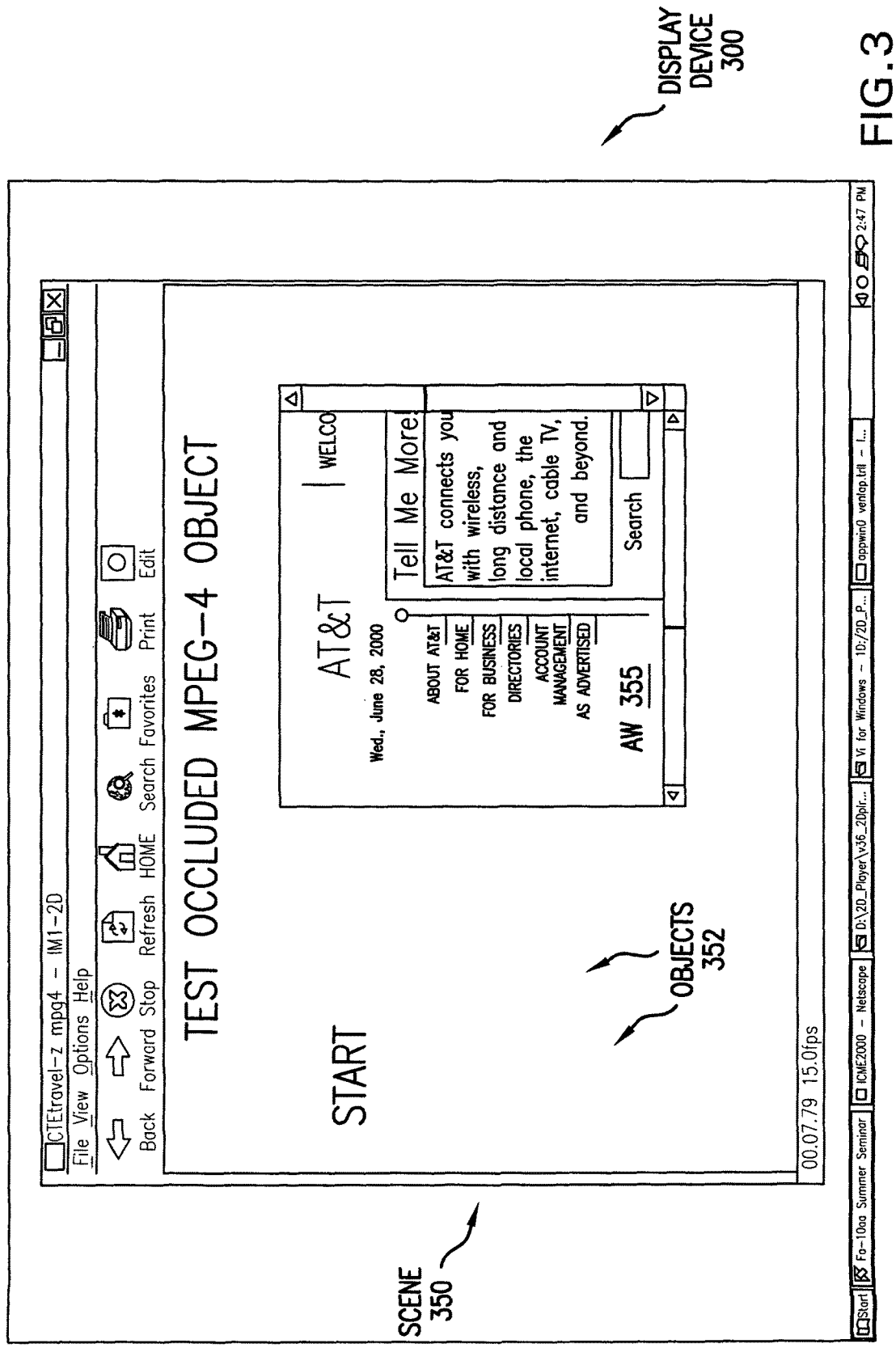
FIG. 3 is another block diagram of a scene rendered from MPEG-4 audiovisual information which includes an external application integrated therein according to an embodiment of the present invention.

FIG. 3 is a block diagram of a scene rendered from MPEG-4 audiovisual information which includes an external application integrated therein according to an embodiment of the present invention. Display device 300 contains an MPEG-4 scene 350. The MPEG-4 scene 350 contains three text objects, START, STOP, and TEST OCCLUDED MPEG-4 OBJECT. The MPEG-4 scene 350 also contains an occluded circle object and an application window 355.

In the code fragment shown above, the url of the application is specified as the first page of the AT&T site on the World Wide Web. When it encounters this node, an MPEG-4 decoder will start a Web browser that is directed to the AT&T site. Thus, in FIG. 3, the application window is controlled and rendered by a Web browser that is displaying the first page of the AT&T site on the World Wide Web. The url may also contain the location of an application, and the url of the page to be displayed may be a parameter to the node. Because the application window 355 is controlled by the Web browser, the user may browse the AT&T site by entering input into the application running within the application window, and the user's input may be passed to the Web browser without invoking a response from the MPEG-4 decoder. The MPEG-4 decoder has control over the size of the application window and control over whether or not the application window is being displayed. The decoder may have a rendering loop during which it refreshes the objects in an MPEG-4 scene. According to an embodiment, when an external application is displaying an application window in the MPEG-4 scene, the MPEG-4 decoder will not refresh or impinge upon the region occupied by the application window.

In the code fragment above, the location of the application window is specified in the translation field of the Transform2d node (−50 150). This location is used to position the application window as shown in FIG. 3. Similarly, the size of the application window is specified as 300 pixels by 300 pixels, and this size information is used to determine the size of the application window in FIG. 3. The startTime and stopTime are set at 0, so the application will not be delayed and does not have a pre-determined stop time. The isActive field is set to TRUE, so the application will run in the foreground.

In the example above, the external application controls the portion of the display that is occupied by the application window. In this embodiment, the application window will overlay and occlude any objects that impinge upon the application window. Thus, as shown in FIG. 3, the portion of the circle object that would overlay the application window is hidden behind the application window. If the application window were to be closed, then the entire circle object would be displayed in the MPEG-4 scene 350.

According to an embodiment, objects such as the text START and STOP of FIG. 3 may be routed to the startTime and stopTime for the external application node. According to this embodiment, a user may be able to start the external application by selecting the START object (e.g., by clicking on the object) and may be able to close the external application by selecting the STOP object. In this case, the application window may be opened when the user starts the external application and may be closed when the user stops the external application.

Figure 4:
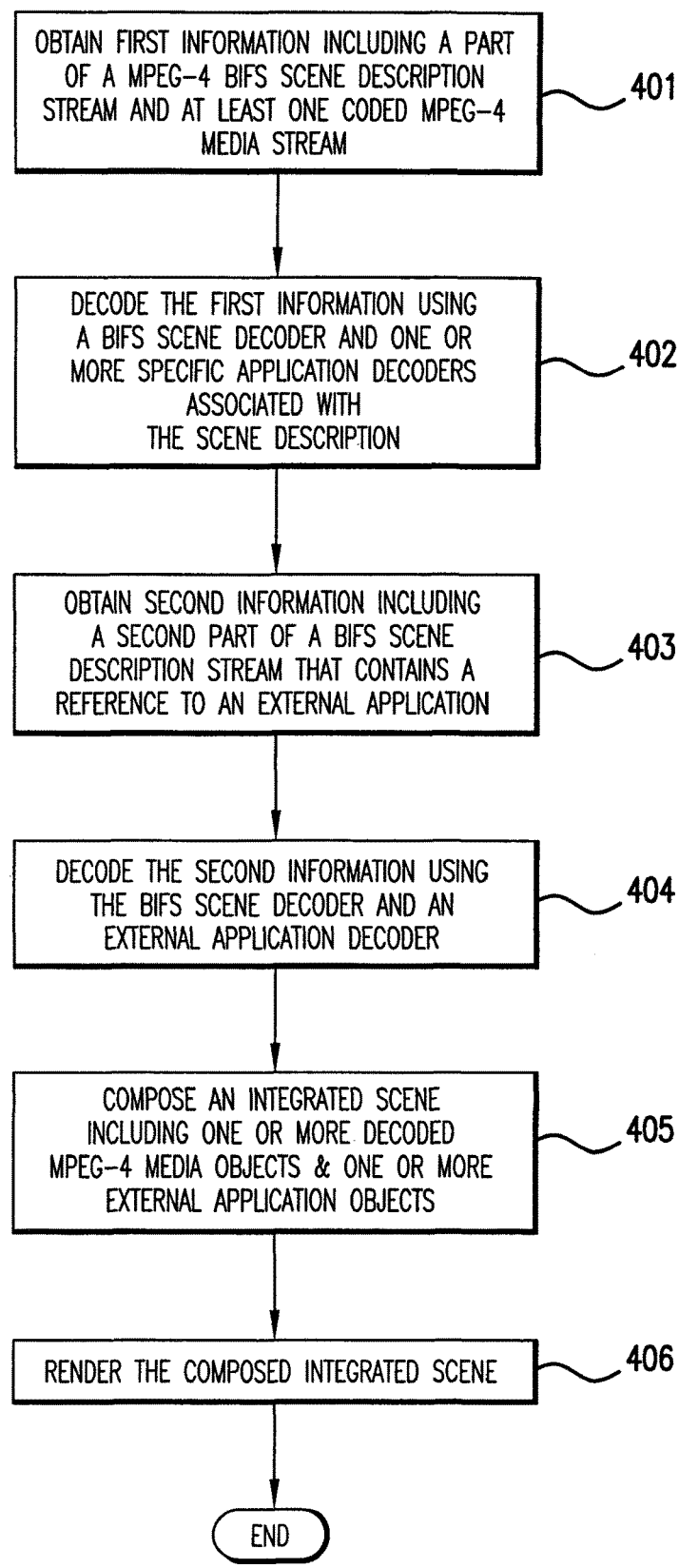
FIG. 4 is a flow diagram illustrating a method for integrating an external application into an MPEG-4 scene according to an embodiment of the present invention.

FIG. 4 is a flow diagram illustrating a method for rendering a scene that includes integrating an external application into an MPEG-4 scene according to an embodiment of the present invention. According to this embodiment, first information that includes a part of a MPEG-4 BIFS scene description stream and at least one coded MPEG-4 media stream is obtained (401). The first information may be obtained, for example, over a network or from a memory device. The first information is decoded using a BIFS scene decoder and one or more specific application decoders associated with the scene description (402). A specific application decoder may be, for example, a video decoder that decodes a video media stream. Second information is obtained including a second part of a BIFS scene description stream that contains a reference to an external application (403). The reference to an external application may correspond to an ApplicationWindow node. The second information is decoded using the BIFS scene decoder and an external application decoder (404). The external application decoder may be an application such as, for example, a web browser or a PDF reader. An integrated scene including one or more decoded MPEG-4 media objects and one or more external application objects is composed (405). The composed integrated scene is rendered, for example, using a display device (406).

In an embodiment, integrating the external application into the scene may include creating an application window within the scene. In addition, integrating the external application into the scene may include configuring the system to provide that the external application receives any input within the application window and controls any output through the application window. In addition, rendering the integrated scene may include preventing native MPEG-4 objects from displaying information within the application window.

In an embodiment, the reference to an external application may include a coded representation of a Universal Resource Locator relating to a location where software (e.g., a decoder) for the external application resides. In a still further embodiment, the reference to an external application includes information identifying a location for an application window within the scene. In another embodiment, the reference to an external application includes information identifying dimensions of the application window. In another embodiment, the reference to an external application includes a start time and a stop time, and the method of rendering a scene further comprises starting the external application at the start time and stopping the external application at the stop time. In a still further embodiment, the reference to an external application includes description information, and integrating the external application into the scene includes displaying a prompt in the scene based on the description information. In another embodiment, the reference to an external application includes application parameters, and starting the external application includes passing the application parameters to the external application.

In another embodiment, a scene is composed and rendered before the reference to an external application is obtained. In this embodiment, second information including a reference to an external application may be obtained after composing and rendering the scene, and the second information may be decoded using a BIFS scene decoder and an external application decoder. The scene may then be recomposed by integrating a sub-scene specified by the decoded second information into the scene, and the re-composed scene may be rendered.

Embodiments of the invention may include a subset of the above described features or may include additional features, and the order of the steps described may be varied.

Figure 5:
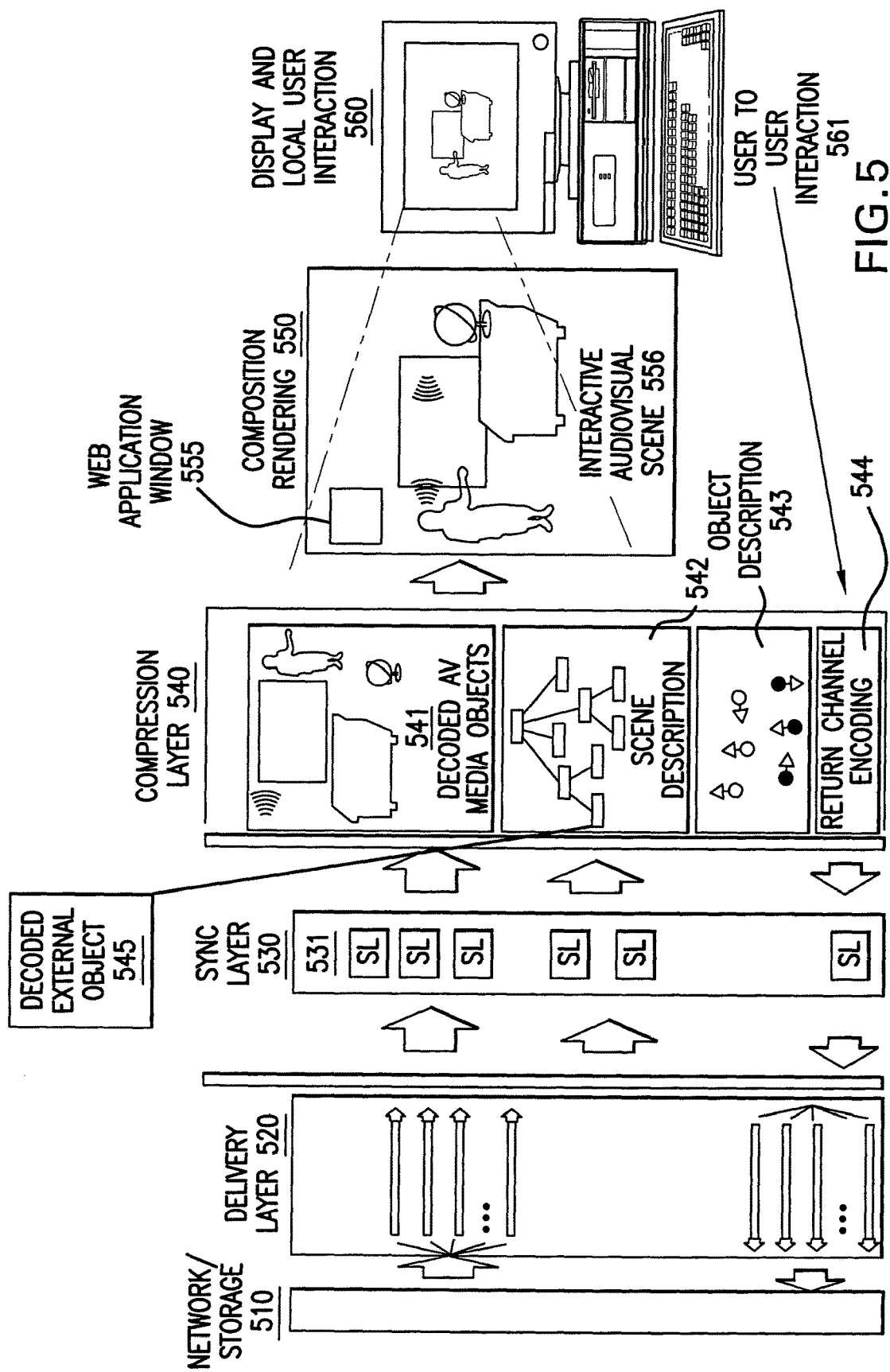
FIG. 5 is a block diagram of the architecture of an MPEG-4 playback system according to an embodiment of the present invention.

FIG. 5 is a block diagram of the architecture of an MPEG-4 playback system according to an embodiment of the present invention. In FIG. 5, an MPEG-4 stream is delivered over Network/Storage Medium 510 via Delivery layer 520. In this embodiment, streams may be obtained by transmission of a network or from a local storage device. Delivery layer 520 may include a transport multiplex, a TransMux (not standardized by MPEG-4 but could be UDP, AAL 2, MPEG-2 Transport Stream, ext.), and an optional multiplex called the FlexMux. Demultiplexed streams may leave via an interface (e.g., a DAI interface) and enter the Sync layer 530, resulting in SL packetized elementary streams 531 that are ready to be decoded. The streams may be decoded in Compression layer 540, which may encapsulate the functions of the media objects 541, scene description 542 and object descriptor 543 decoding. The scene description 542 may contain a reference to an external application, such as the Application Window node discussed above. Compression layer 540 may yield individual decoded objects and related descriptors. The external application may decode a stream and yield a decoded external object 545. The composition and rendering process 550 may use the scene description and decoded media to compose and render the Audiovisual scene 556, which may include a window for an external application such as Web Application Window 555. Composition may involve putting objects in a scene together, and rendering may involve presenting the scene to the user. Thus, the composition and rendering process 555 may pass the audiovisual scene to the presenter, which may be one or more of the input/output devices discussed above, and may allow a user to interact with the presentation of the scene, as shown in Display and User Interaction 560. The actions necessary for user interaction 561 (e.g., a request for additional media streams) may be sent back to the Network/Storage Medium 510 through the compression layer (via Rendering Channel Encoding 554), sync layer and delivery layer.

MPEG-4 is an object based standard for multimedia coding that codes individual video objects and audio objects in the scene and delivers in addition a coded description of the scene. In the present invention, the coded scene description may include a reference to an external application. At the decoding end, the scene description and individual media objects are decoded, synchronized and composed for presentation. In the present invention, an external application decoder may decode information into one or more external application objects.

Several embodiments of the present invention are specifically illustrated and/or described herein. However, it will be appreciated that modifications and variations of the present invention are covered by the above teachings and within the purview of the appended claims without departing from the spirit and intended scope of the invention. For example, while FIG. 2 shows MPEG-4 decoder instructions stored in a memory array, the MPEG-4 decoder could be implemented in hardware (e.g., a decoder board) or downloaded from a network. As another example, the fields of the node described may be varied.

We claim:

1. A system comprising:
a processor; and
a computer-readable storage device storing instructions which, when executed by the processor, cause the processor to perform operations comprising:
obtaining first information comprising a part of a scene description stream and a coded media stream conforming to a coding standard;
decoding the first information using a scene decoder and a specific application decoder associated with a scene description to yield a decoded media object;
obtaining second information comprising a second part of the scene description stream that contains a reference to an external application that decodes data in a manner that does not conform to the coding standard, wherein the reference to the external application identifies a location of the external application;
decoding the second information using the scene decoder and the external application to yield an external application object;
composing an integrated scene comprising the decoded media object and the external application object to yield a composed integrated scene; and
rendering the composed integrated scene.

2. The system of claim 1, wherein the scene description stream comprises a BIFS scene description stream.

3. The system of claim 2, wherein the BIFS scene description stream comprises an MPEG-4 BIFS scene description stream.

4. The system of claim 1, wherein the coded media stream comprises a coded MPEG-4 media stream.

5. The system of claim 1, wherein the coded media stream comprises a plurality of coded media streams.

6. The system of claim 1, wherein the reference to the external application comprises a coded representation of a universal resource locator.

7. The system of claim 1, wherein the reference to the external application comprises a universal resource locator identifying the location of the external application.

8. A system comprising:
a processor; and
a computer-readable storage device storing instructions which, when executed by the processor, cause the processor to perform operations comprising:
obtaining first information comprising a first part of a scene description stream and a coded media stream conforming to a coding standard;
decoding the first information using a scene decoder and a specific application decoder associated with a scene description;
obtaining second information comprising a second part of the scene description stream that contains a reference to an external application that decodes data in a manner that does not conform to the coding standard, wherein the reference to the external application comprises a start time and a stop time;
decoding the second information using the scene decoder and the external application to yield an external application object;
composing an integrated scene comprising a decoded media object and the external application object to yield a composed integrated scene;
rendering the composed integrated scene;
starting the external application at the start time; and
stopping the external application at the stop time.

9. The system of claim 8, wherein the scene description stream comprises a BIFS scene description stream.

10. The system of claim 9, wherein the BIFS scene description stream comprises an MPEG-4 BIFS scene description stream.

11. The system of claim 8, wherein the coded media stream comprises a coded MPEG-4 media stream.

12. The system of claim 8, wherein the coded media stream comprises a plurality of coded media streams.

13. The system of claim 8, wherein the reference to the external application further comprises a coded representation of a universal resource locator.

14. The system of claim 8, wherein the reference to the external application further comprises a universal resource locator identifying a location of the external application.

15. A system comprising:
a processor; and
a computer-readable storage device storing instructions which, when executed by the processor, cause the processor to perform operations comprising:
obtaining first information comprising a first part of a scene description stream and a coded media stream conforming to a coding standard;
decoding the first information using a scene decoder and a specific application decoder associated with the scene description to yield a decoded media object;
obtaining second information comprising a second part of the scene description stream that contains a reference to an external application that decodes data in a manner that does not conform with the coding standard, wherein the reference to the external application comprises description information;
decoding the second information using the scene decoder and the external application to yield an external application object;
composing an integrated comprising the decoded media object and the external application object to yield a composed integrated scene;
rendering the composed integrated scene; and
displaying a prompt in the composed integrated scene based on the description information.

16. The system of claim 15, wherein the scene description stream comprises a BIFS scene description stream.

17. The system of claim 16, wherein the BIFS scene description stream comprises an MPEG-4 BIFS scene description stream.

18. The system of claim 15, wherein the coded media stream comprises a coded MPEG-4 media stream.

19. The system of claim 15, wherein the reference to the external application further comprises a coded representation of a universal resource locator.

20. The system of claim 15, wherein the reference to the external application further comprises a universal resource locator identifying a location of the external application.

* * * * *